US012728993B2

(12) United States Patent
Hessling von Heimendahl et al.

(10) Patent No.: US 12,728,993 B2
(45) Date of Patent: Sep. 8, 2026

(54) AIRCRAFT OVERHEAD PASSENGER SERVICE UNIT

(71) Applicant: Goodrich Lighting Systems Gmbh & Co. KG, Lippstadt (DE)

(72) Inventors: Andre Hessling von Heimendahl, Koblenz (DE); Detlev Degenhardt, Stockelsdorf (DE)

(73) Assignee: Goodrich Lighting Systems GmbH & Co. KG, Lippstadt (DE)

( * ) Notice: Subject to any disclaimer, the term of this patent is extended or adjusted under 35 U.S.C. 154(b) by 692 days.

(21) Appl. No.: 18/301,151

(22) Filed: Apr. 14, 2023

(65) Prior Publication Data

US 2023/0339613 A1 Oct. 26, 2023

(30) Foreign Application Priority Data

Apr. 21, 2022 (EP) .................................... 22169189

(51) Int. Cl.
*B64D 11/00* (2006.01)
*A62B 7/14* (2006.01)
*A62B 25/00* (2006.01)

(52) U.S. Cl.
CPC ................ *B64D 11/00* (2013.01); *A62B 7/14* (2013.01); *A62B 25/005* (2013.01); *B64D 2011/0053* (2013.01); *B64D 2231/025* (2013.01)

(58) Field of Classification Search
CPC .. A62B 25/005; A62B 7/14; B64D 2231/025; B64D 11/06; B64D 11/0601; B64D 11/003; B64D 11/00
See application file for complete search history.

(56) References Cited

U.S. PATENT DOCUMENTS

| | | | | |
|---|---|---|---|---|
| 2,931,355 | A * | 4/1960 | Miller .................... | A62B 11/00 128/204.29 |
| 4,154,237 | A * | 5/1979 | Courter .................. | B64D 11/00 244/118.6 |
| 7,253,744 | B2 | 8/2007 | Colacecchi | |
| 7,621,275 | B2 * | 11/2009 | Fischer ................ | A62B 25/005 128/205.25 |
| 7,641,370 | B2 | 1/2010 | Heine et al. | |

(Continued)

OTHER PUBLICATIONS

European Patent Office, European Search Report dated Sep. 19, 2022 in Application No. 22169189.2.

*Primary Examiner* — Bradley H Philips
(74) *Attorney, Agent, or Firm* — SNELL & WILMER L.L.P.

(57) ABSTRACT

An aircraft overhead passenger service unit comprises a plurality of oxygen masks for supplying oxygen to aircraft passengers in an emergency situation; and at least two different oxygen mask storage portions, which are spaced apart from each other in a longitudinal direction (L). The plurality of oxygen masks are stored in the at least two different oxygen mask storage portions. The aircraft overhead passenger service unit further comprises an oxygen mask controller, which is switchable between at least two different configurations. The at least two different oxygen mask storage portions are individually associated with the at least two different configurations, with each of the at least two different configurations effecting a release of only the oxygen masks of the associated oxygen mask storage portion in the emergency situation.

15 Claims, 9 Drawing Sheets

(56) References Cited

U.S. PATENT DOCUMENTS

| | | | | |
|---|---|---|---|---|
| 8,907,662 | B2 | 12/2014 | Bauer et al. | |
| 10,850,852 | B2 | 12/2020 | Movsesian et al. | |
| 2010/0051113 | A1 | 3/2010 | Bricard et al. | |
| 2011/0146686 | A1* | 6/2011 | Schneider | B64D 13/00 128/205.25 |
| 2012/0032027 | A1* | 2/2012 | Gehm | B64D 11/00 307/9.1 |
| 2012/0292986 | A1* | 11/2012 | Riedel | B64D 11/0693 307/9.1 |
| 2013/0005231 | A1* | 1/2013 | Schneider | B64D 13/00 454/76 |
| 2020/0231286 | A1 | 7/2020 | Movsesian et al. | |

* cited by examiner 105
144
142
25
109d
81
80d
109c
80c
109b
80b
$D_2$
109a
80a
L 110
31
30
26
28
144
142
20
25b
24
12
12
12
22
L
d
129a
128a
127a
126a
128b
129b
127b
126b
129c
128c
127c
126c
24
25a
12
12
12
22
T
a
T
b
T 25b
110d
126-2
126-1
25a
81
80c
25b
110c
126-2
126-1
25a
126-2
25b
110b
126-1
25a
81
$D_1$
80b
25b
110a
126-2
126-1
25a
81
80a
32
104

32
104
110a
110b
110c
110d
25a
25b
26
126-1
126-2
81
80a
80b
80c
80d
D2

AIRCRAFT OVERHEAD PASSENGER SERVICE UNIT

CROSS-REFERENCE TO RELATED APPLICATIONS

This application claims priority to, and the benefit of, EP Patent Application No. 22169189.2, filed Apr. 21, 2022 and titled "AIRCRAFT OVERHEAD PASSENGER SERVICE UNIT," which is incorporated by reference herein in its entirety for all purposes

FIELD

The present invention is in the field of aircraft overhead passenger service units. The present invention is in particular related to aircraft overhead passenger service units, which may be adjusted to different geometries of an aircraft passenger cabin, in particular to different seat configurations/seat maps within the aircraft passenger cabin.

BACKGROUND

Passenger aircraft, such as commercial airplanes, which comprise a passenger cabin with passenger seats, are usually equipped with aircraft overhead passenger service units ("PSUs"), which are arranged above the passenger seats. Such aircraft overhead passenger service units may comprise individually switchable passenger reading lights, air gaspers for supplying fresh air to the passengers, loudspeakers and switchable visual signs. The aircraft overhead passenger service units may further comprise oxygen masks, which may be released and activated for supplying an oxygen rich gas to the passengers in emergency situations, in particular in emergency situations which result in a loss of air pressure within the aircraft passenger cabin.

In order to provide the desired functionalities in a satisfactory manner, the passenger service units should be arranged at expedient positions with respect to the associated passenger seats. In previous approaches, the positions of the passenger service units are adjusted when the seat configuration/seat map is modified and the positions of the passenger seats within the aircraft passenger cabin are changed. Changing the positions of the passenger service units within the aircraft passenger cabin is a cumbersome and time consuming task, which adds additional burden to the modification of the seat configuration/seat map.

SUMMARY

It would therefore be beneficial to provide an aircraft overhead passenger service unit that allows for switching between different seat configurations/seat maps within a passenger cabin of an aircraft more easily.

Exemplary embodiments of the invention include an aircraft overhead passenger service unit, which is to be installed above the passenger seats in a passenger cabin of an aircraft, and which comprises a plurality of oxygen masks for supplying oxygen to aircraft passengers in an emergency situation. In accordance with an exemplary embodiment of the invention, the aircraft overhead passenger service unit comprises at least two different oxygen mask storage portions, which are spaced apart from each other in a longitudinal direction. When the aircraft overhead passenger service unit is installed within an aircraft, said longitudinal direction may coincide with the longitudinal extension of the aircraft.

The plurality of oxygen masks are stored in the at least two different oxygen mask storage portions. In other words, the plurality of oxygen masks are distributed among the at least two different oxygen mask storage portions. In yet other words, a first group of oxygen masks is stored in a first oxygen mask storage portion, and a second group of oxygen masks is stored in a second oxygen mask storage portion, which is spaced apart from the first oxygen mask storage portion.

The aircraft overhead passenger service unit further comprises an oxygen mask controller, which is switchable between at least two different oxygen mask supply configurations. The at least two different oxygen mask storage portions are individually associated with the at least two different oxygen mask supply configurations of the oxygen mask controller. In other words, each of the at least two different oxygen mask storage portions is associated with a particular one of the at least two different oxygen mask supply configurations.

Each of the at least two different oxygen mask supply configurations effects that only the oxygen masks, which are stored in the respectively associated oxygen mask storage portion, are released in an emergency situation. The at least two different oxygen mask supply configurations may also include a configuration, in which no oxygen masks are released in the emergency situation.

Exemplary embodiments of the invention also include aircraft, such as an airplane or a helicopter, comprising a passenger cabin and a plurality of aircraft overhead passenger service units according to exemplary embodiments of the invention. The plurality of aircraft overhead passenger service units may be installed as one or more passenger service unit arrays along a longitudinal direction of the aircraft within the passenger cabin. The aircraft overhead passenger service units may be installed so that adjacent aircraft overhead passenger service units abut against each other. In alternative embodiments, gaps or filler elements may be present between adjacent aircraft overhead passenger service units. A plurality of passenger service unit arrays may be associated with a plurality of passenger seat blocks. For example, in an aircraft with a center aisle only and no separators between different classes, the passenger seats to the left of the center aisle may form a first passenger seat block, associated with a first passenger service unit array along the longitudinal direction of the aircraft, and the passenger seats to the right of the center aisle may form a second passenger seat block, associated with a second passenger service unit array along the longitudinal direction of the aircraft. The additional features, modifications and effects, described herein with respect to exemplary embodiments of an aircraft overhead passenger service unit, apply to the aircraft in an analogous manner.

Exemplary embodiments of the invention further include a method of configuring an aircraft overhead passenger service unit according to an exemplary embodiment of the invention, wherein the method includes: on the basis of a service unit position of the aircraft overhead passenger service unit within a passenger cabin of an aircraft, determining an associated passenger seat or a row of associated passenger seats within the passenger cabin; and on the basis of the service unit position of the aircraft overhead passenger service unit and a seat position of the associated passenger seat or the row of associated passenger seats, selecting a particular one of the at least two different configurations of the oxygen mask controller. The additional features, modifications and effects, described herein with respect to exemplary embodiments of an aircraft overhead passenger service unit, apply to the method of configuring an aircraft overhead passenger service unit in an analogous manner.

An aircraft overhead passenger service unit according to an exemplary embodiment of the invention may be adapted easily to at least two different passenger seat configurations by selectively switching the oxygen mask controller between the at least two different oxygen mask supply configurations. As compared to previous approaches, the passenger seat configuration of an aircraft, which is equipped with aircraft overhead passenger service units according to exemplary embodiments of the invention, may be changed quickly and conveniently. In accordance with a modified passenger seat configuration/passenger seat map, the oxygen mask controllers of the aircraft passenger service units may be selectively switched between their respective at least two different oxygen mask supply configurations. The dropping locations of the released oxygen masks may be adapted to the modified passenger seat configuration/passenger seat map in a quick and convenient manner. Such adaptation may be carried out without changing the positions of the aircraft overhead passenger service units in the aircraft cabin.

In an aircraft according to an exemplary embodiment of the invention, the aircraft cabin is configured to be selectively equipped with passenger seats in accordance with a plurality of seat maps. The plurality of seat maps may differ, for at least a portion of the aircraft cabin, with respect to the distances between adjacent passengers' seats along the longitudinal direction, of the aircraft. For each of the plurality of different seat maps, each passenger seat is associated with a particular one of the plurality of aircraft overhead passenger service units, and, for at least a portion of the aircraft cabin, the relative positions between the plurality of aircraft overhead passenger service units and the respectively associated passenger seats differ among the plurality of seat maps. With the spaced arrangement of the different oxygen mask storage portions of the aircraft overhead passenger service units, the aircraft overhead passenger service units provide inherent flexibility to adapt the dropping locations of the oxygen masks to the differing seat maps.

An aircraft according to an exemplary embodiment of the invention may further comprise a central controller, which is coupled to the oxygen mask controllers of the plurality of aircraft overhead passenger service units. The central controller and the oxygen mask controllers of the plurality of aircraft overhead passenger service units may be coupled in such a way that the central controller can control the oxygen mask controllers of the plurality of aircraft overhead passenger service units with respect to the selection of the oxygen mask supply configuration.

The central controller may be configured for communicating with the oxygen mask controllers via wired or wireless connections. Wireless connections may be implement using WLAN, Bluetooth®, or a similar technology.

The central controller may be integrated into one of the aircraft overhead passenger service units. Alternatively, the central controller may be provided separately from the aircraft overhead passenger service units.

In an embodiment, the central controller may be configured to: determine the relative positions between the plurality of aircraft overhead passenger service units and the respectively associated passenger seats for a current seat map of the aircraft cabin of the aircraft; and, for each of the plurality of aircraft overhead passenger service units, control the oxygen mask controller of the respective aircraft overhead passenger service unit to assume a particular one of the at least two different configurations on the basis of said relative positions.

The central controller may be configured to determine the relative positions between the plurality of aircraft overhead passenger service units and the respectively associated passenger seats by calculating the relative positions from the raw data of the absolute positions of the plurality of aircraft overhead passenger service units and the absolute positions of the passenger seats within the aircraft. It is also possible that the central controller uses the current seat map and the distribution of the aircraft overhead passenger service units as known input variables for accessing the associations and relative positions between seats and aircraft overhead passenger service units from a database. Other ways of determining the relative positions are possible as well.

As a result, the oxygen mask supply configurations of the aircraft overhead passenger service units may be set quickly and easily in correspondence with a current seat configuration/current seat map by providing a coordinated control via the central controller. Such an approach may avoid the need for individually setting the oxygen mask supply configurations of the aircraft overhead passenger service units. It may also help in keeping the local controllers, i.e. the oxygen mask controllers, of the aircraft overhead passenger service units lean.

Exemplary embodiments of the invention further include a method of configuring the plurality of aircraft overhead passenger service units of an aircraft according to an exemplary embodiment of the invention, wherein the method includes: relating a current seat map of the aircraft cabin of the aircraft to the positions of the plurality of aircraft overhead passenger service units within the aircraft cabin; and for each of the plurality of aircraft overhead passenger service units, controlling the oxygen mask controller of the respective aircraft overhead passenger service unit to assume a particular one of the at least two different configurations on the basis of said relating of the current seat map of the aircraft cabin of the aircraft to the positions of the plurality of aircraft overhead passenger service units within the aircraft cabin. The additional features, modifications and effects, described herein with respect to exemplary embodiments of an aircraft overhead passenger service unit, with respect to exemplary embodiments of an aircraft, and with respect to exemplary embodiments of a method of configuring an aircraft overhead passenger service unit, apply to the method of configuring the plurality of aircraft overhead passenger service units of an aircraft in an analogous manner.

In an embodiment, each of the at least two oxygen mask storage portions comprises an oxygen mask storage compartment, which is equipped with a movable door. The movable door may be configured to open for releasing the oxygen masks stored within the respective oxygen mask storage compartment in case of a pressure loss within the passenger cabin. The movable door may be configured to open in response to a signal supplied by the oxygen mask controller and/or in response to an emergency signal provided by a pressure loss detector, which is configured for detecting a loss of air pressure within the passenger cabin.

After the movable door of the oxygen mask storage compartment has been opened and the oxygen masks have been released, an oxygen supply, which is configured for supplying an oxygen rich gas to the oxygen masks, may be activated.

The oxygen supply may be activated in response to the emergency signal. Alternatively, the oxygen supply may be activated in response to a first breath, which is taken by a passenger through the oxygen mask after applying the oxygen mask to his/her face. The oxygen supply may be an oxygen source, arranged in the aircraft overhead passenger service unit. The oxygen source may be a stand-alone unit that is able to provide oxygen by itself, i.e. without receiving oxygen from an entity outside of the aircraft overhead passenger service unit. The oxygen source may be a pressurized oxygen container, such as a pressurized oxygen cylinder. It is also possible that the oxygen source is a chemical oxygen generator. The chemical oxygen generator may generate oxygen at the time of use via a chemical reaction. The pressurized oxygen container may have a mechanical actuator/initiator or a pyroelectric actuator/initiator. Similarly, the chemical oxygen generator may have a mechanical starter or a pyroelectric starter.

In an alternative configuration, the oxygen masks may be supplied with oxygen from a centralized oxygen supply, which is configured for supplying oxygen to the oxygen masks of a plurality of aircraft overhead passenger service units within the passenger cabin.

In an embodiment, one, two, three, four, five or more oxygen masks are stored in each of the at least two oxygen mask storage portions, respectively. In particular, the same number of oxygen masks may be stored in the at least two oxygen mask storage portions, respectively.

In order to ensure that each passenger is provided with an individual oxygen mask, the number of oxygen masks, which are stored in each of the at least two oxygen mask storage portions, may be at least as large as the number of passenger seats associated with the respective aircraft overhead passenger service unit. For redundancy and/or for supplying additional oxygen masks to small children, which are not assigned to their own passenger seat, at least one extra oxygen mask may be provided in each oxygen mask storage portion.

In an embodiment, each of the at least two oxygen mask storage portions comprises an array of oxygen masks. The array of oxygen masks may extend in a transverse direction, i.e. in a direction, which is oriented transversely, in particular perpendicularly, to the longitudinal direction. The transverse direction may in particular be oriented parallel to the row of passenger seats, which are associated with the respective aircraft overhead passenger service unit, so that at least one oxygen mask may be released over each passenger seat. Such a configuration may make it easier for the passengers to identify and grab their respectively assigned oxygen mask.

In an embodiment, each of the at least two oxygen mask storage portions may has a maximum extension of 203 mm, or 8 inches, in particular a maximum extension of 152 mm, or 6 inches, in the longitudinal direction, and a maximum extension of 610 mm, or 24 inches, in particular a maximum extension of 305 mm, or 12 inches, in the transverse direction. Such dimensions of the mask storage portions have been found as well suited for storing suitable numbers of oxygen masks, while allowing for the at least two oxygen mask storage portions to be accommodated well in the aircraft overhead passenger service unit.

In an embodiment, the distance between the oxygen mask storage portions along the longitudinal direction is between 254 mm (10 inches) and 457 mm (18 inches), in particular between 330 mm (13 inches) and 381 mm (15 inches). Such distances between the oxygen mask storage portions have been found suitable for adjusting the aircraft overhead passenger service unit to commonly used seat configurations, in particular to seat configurations in which the distances between adjacent seat rows along the longitudinal direction L varies between 660 mm (26 inch) and 889 mm (35 inch). In particular, the stated distance values between the oxygen mask storage portions may allow for at least one of the oxygen mask storage portions and, thus, for at least one of the release positions of oxygen masks to be in good reach for the passengers for a wide range of seat configurations.

In an embodiment, the aircraft overhead passenger service unit further comprises an oxygen supply, in particular an oxygen source such as a pressurized oxygen container or a chemical oxygen generator, which is configured for supplying oxygen to the oxygen masks in an emergency situation. The aircraft overhead passenger service unit may in particular comprise a joint oxygen supply, such as a joint oxygen source, which is configured for supplying oxygen to all oxygen masks of the respective aircraft overhead passenger service unit, i.e. to the oxygen masks of all of the at least two oxygen mask storage portions.

In an alternative embodiment, the oxygen masks may be supplied with oxygen from a centralized oxygen supply, which is configured for supplying oxygen to the oxygen masks of a plurality or even all aircraft overhead passenger service units within the passenger cabin.

In an embodiment, the aircraft overhead passenger service unit further comprises at least one reading light and an associated reading light controller. The at least one reading light and the associated reading light controller may be switchable between at least two different reading light configurations, wherein different reading light outputs are emitted by the at least one reading light in each of the at least two reading light configurations.

Such an embodiment may allow for easily adjusting the reading light output(s), emitted by the at least one reading light of the passenger service unit, to at least two different seat configurations/seat maps by selectively switching the reading light controller into a corresponding reading light configuration.

Alternatively or additionally, the reading light output, provided by the at least one reading light, may be manually adjustable for adjusting the light output of the at least one reading light to the respective seat configuration.

The reading light controller may be coupled to or formed integrally with the oxygen mask controller for switching the reading light controller between the at least two different reading light configurations together with the oxygen mask controller. In this way, the reading light configuration may be adjusted together with the oxygen mask supply configuration. Such a coupling between the reading light controller and the oxygen mask controller may make the adjustment of the aircraft passenger service unit to different seat configurations even more convenient.

The aircraft overhead passenger service unit may comprise a single group of reading lights, wherein each of the reading lights is associated with one of the passenger seats and is switchable between at least two reading light configurations.

In an alternative embodiment, the aircraft overhead passenger service unit may comprise a plurality of groups of reading lights, wherein each of the reading lights of each group is associated with one of the passenger seats, respectively. Each group of reading lights is associated with one of the different reading light configurations. In this embodiment, the reading lights of one of the plurality of groups of reading lights may be selectively activated, depending on the selected reading light configuration.

In an embodiment, the aircraft overhead passenger service unit further comprises at least one gasper and an associated gasper controller. The at least one gasper and the associated gasper controller may be switchable between at least two different gasper configurations, wherein a different output of air is provided by the at least one gasper in each of the at least two gasper configurations.

Such an embodiment may allow for easily adjusting the output of air, provided by the at least one gasper of the passenger service unit, to at least two different seat configurations/seat maps by selectively switching the gasper controller into the corresponding gasper configuration.

Alternatively or additionally, the output of air, provided by the at least one gasper, may be manually adjustable for adjusting the output of air to the respective seat configuration.

The gasper controller may be coupled to or formed integrally with the oxygen mask controller for switching the gasper controller between the at least two different gasper configurations together with the oxygen mask controller. In this way, the gasper configuration may be adjusted together with the oxygen mask supply configuration. Such a coupling between the gasper controller and the oxygen mask controller may make the adjustment of the aircraft passenger service unit to different seat configurations even more convenient.

The aircraft overhead passenger service unit may comprise a single group of gaspers, wherein each of the gaspers is associated with a passenger seat and switchable between at least two gasper configurations.

In an alternative embodiment, the aircraft overhead passenger service unit may comprise a plurality of groups of gaspers, wherein each of the gaspers of each group is associated with one of the passenger seats, respectively. Each group of gaspers is associated with one of the different gasper configurations. In this embodiment, the gaspers of one of the plurality of groups of gaspers may be selectively activated, depending on the selected gasper configuration.

If the aircraft overhead passenger service unit comprises a reading light controller and a gasper controller, both the reading light controller and the gasper controller may be coupled to or formed integrally with the oxygen mask controller. In particular, an integrated oxygen mask and reading light and gasper controller may form a single controller of the aircraft overhead passenger service unit. An integration/a coupling of the mentioned controllers may allow for jointly switching between the at least two oxygen mask supply configurations, the at least two reading configurations and the at least two gasper configurations.

In an embodiment, the aircraft overhead passenger service unit further comprises at least one of a loudspeaker, a switchable visual sign, such as a "non-smoking" sign and/or a "fasten your seat belt" sign, and at least one electric switch.

The aircraft overhead passenger service unit may in particular comprise an electric switch or a group of electric switches, which allow for individually switching each of the reading lights.

The aircraft overhead passenger service unit may also comprise an electric switch or a group of electric switches for triggering a call signal to the cabin personnel.

The aircraft overhead passenger service unit may comprise a respective electric switch for individually switching a reading light and a respective electric switch for triggering a call signal to the cabin personnel for each passenger seat associated with the aircraft overhead passenger service unit.

BRIEF DESCRIPTION OF THE DRAWINGS

Further exemplary embodiments of the invention are described below with respect to the accompanying drawings, wherein.

DETAILED DESCRIPTION

Figure 1:
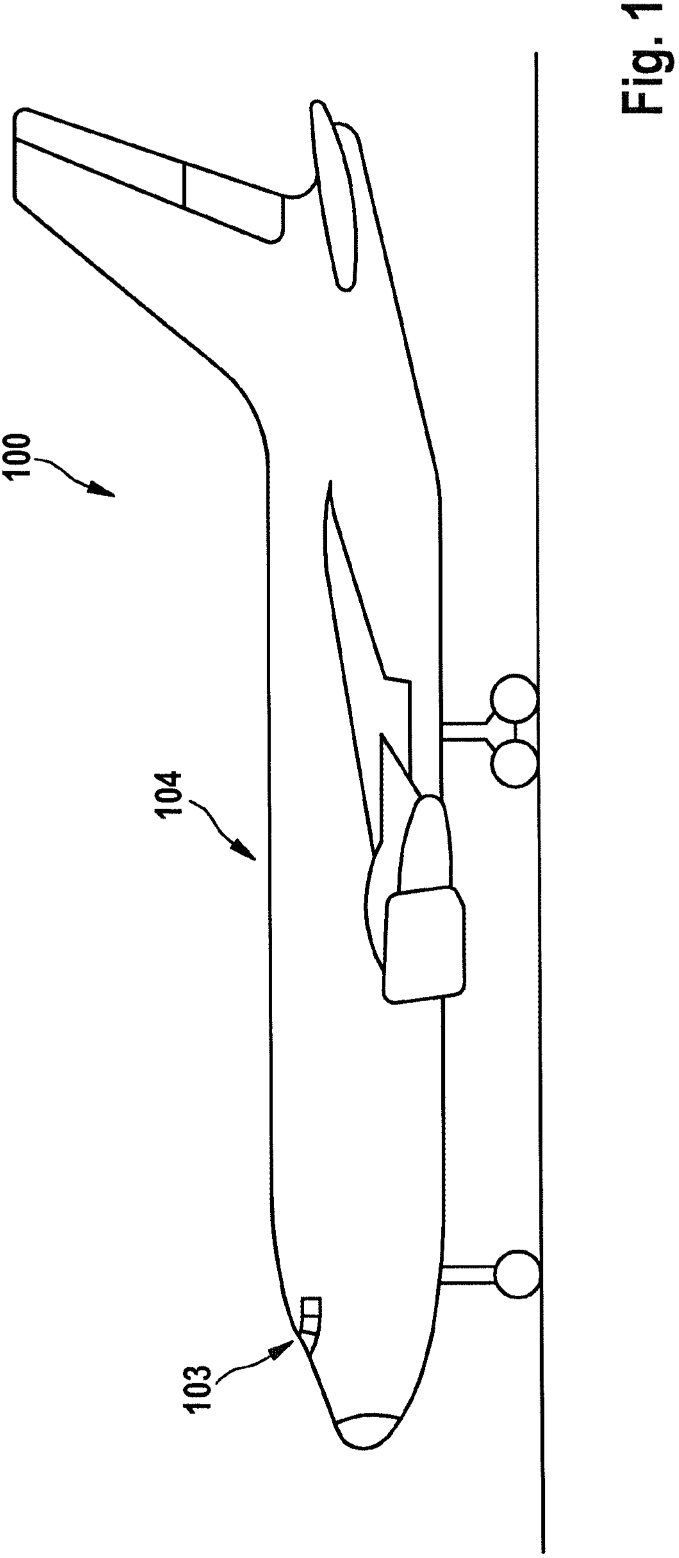
FIG. 1 depicts a schematic side view of an aircraft in accordance with an exemplary embodiment of the invention.

FIG. 1 depicts a schematic side view of an aircraft 100, in particular of an airplane, in accordance with an exemplary embodiment of the invention. In the exemplary embodiment shown in FIG. 1, the aircraft 100 is a large passenger airplane, comprising a cockpit 103 and a passenger cabin 104. The aircraft 100 may be a commercial passenger airplane, a private airplane, or a military aircraft. It is also possible that an aircraft overhead passenger service unit according to an exemplary embodiment of the invention is employed in a rotorcraft, such as a helicopter.

Figure 2:
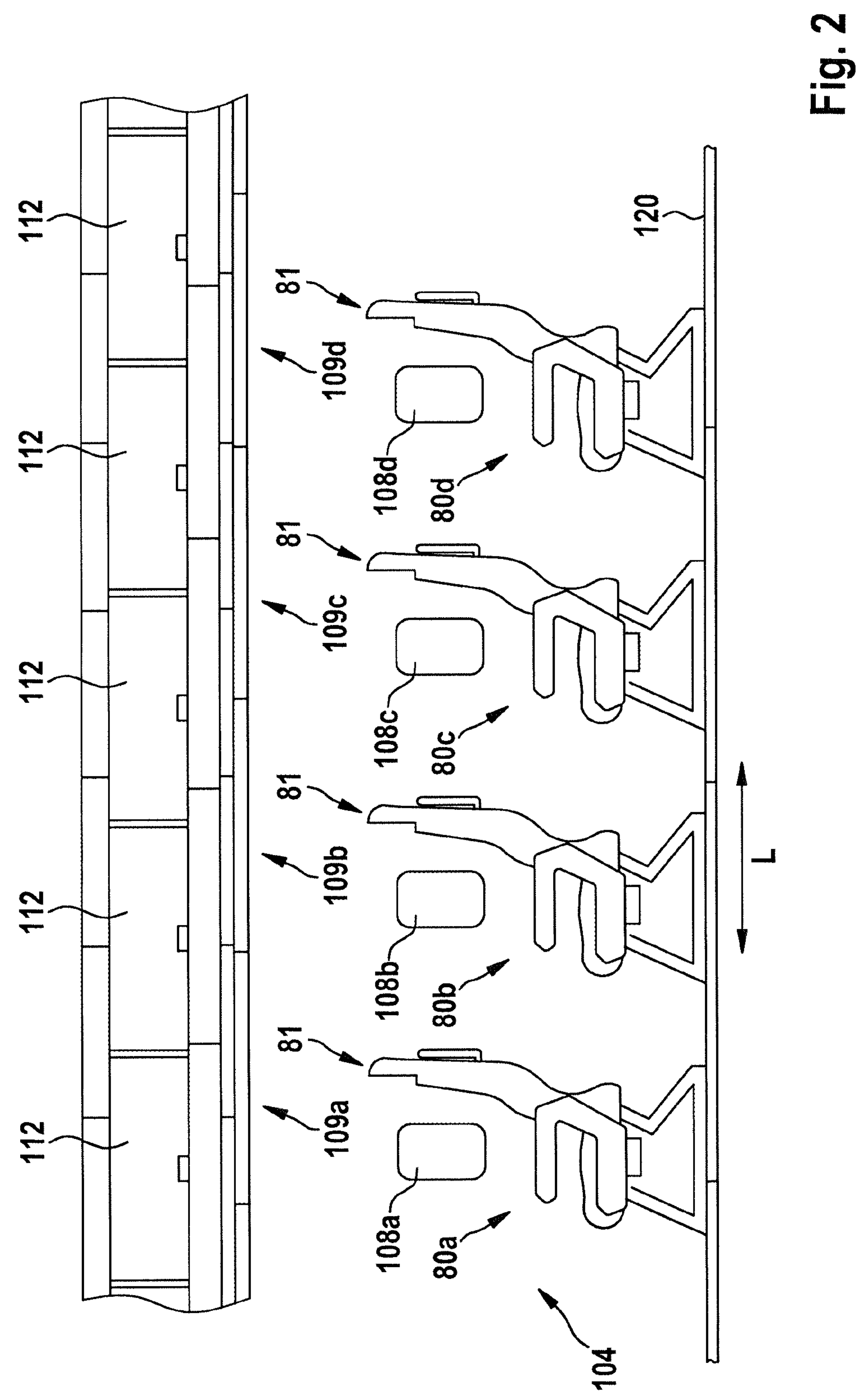
FIG. 2 shows a schematic longitudinal cross-sectional view of a section of a passenger cabin of the aircraft of FIG. 1.

FIG. 2 shows a schematic longitudinal cross-sectional view of a section of the passenger cabin 104 of the aircraft 100 of FIG. 1.

Four seats 81, which are also referred to as passenger seats 81, are visible in FIG. 2. The passenger seats 81 are mounted to the floor 120 of the passenger cabin 104. Each of the depicted passenger seats 81 belongs to a different seat row 80*a*-80*d*. The seat rows 80*a*-80*d* are spaced apart from each other along the longitudinal direction L of the passenger cabin 104.

For each of the seat rows 80*a*-80*d*, a window 108*a*-108*d* is provided, which allows the passengers to view the outside of the aircraft 100. Further, a plurality of over-head baggage compartments 112, which provide storage space for the passengers' baggage, are provided above the passenger seats 81.

Each seat row 80*a*-80*d* may include a plurality of passenger seats 81, for example three passenger seats 81, which are arranged next to each other. The additional passenger seats (middle seat and window seat) of each seat row 80_a_-80_d_ are not visible in FIG. 2, as they are arranged behind and therefore hidden by the depict-ed passenger seats (aisle seats) 81.

An aircraft overhead passenger service unit 109_a_-109_d_ is provided above each of the seat rows 80_a_-80_d_, respectively. The aircraft overhead passenger service unit 109_a_-109_d_ may be embodied in accordance with exemplary embodiments of the invention. For ease of illustration, a comparative example of an aircraft overhead passenger service unit is shown in an described with respect to FIG. 3, before turning to the description of aircraft overhead passenger service units in accordance with exemplary embodiments of the invention.

Figure 3:
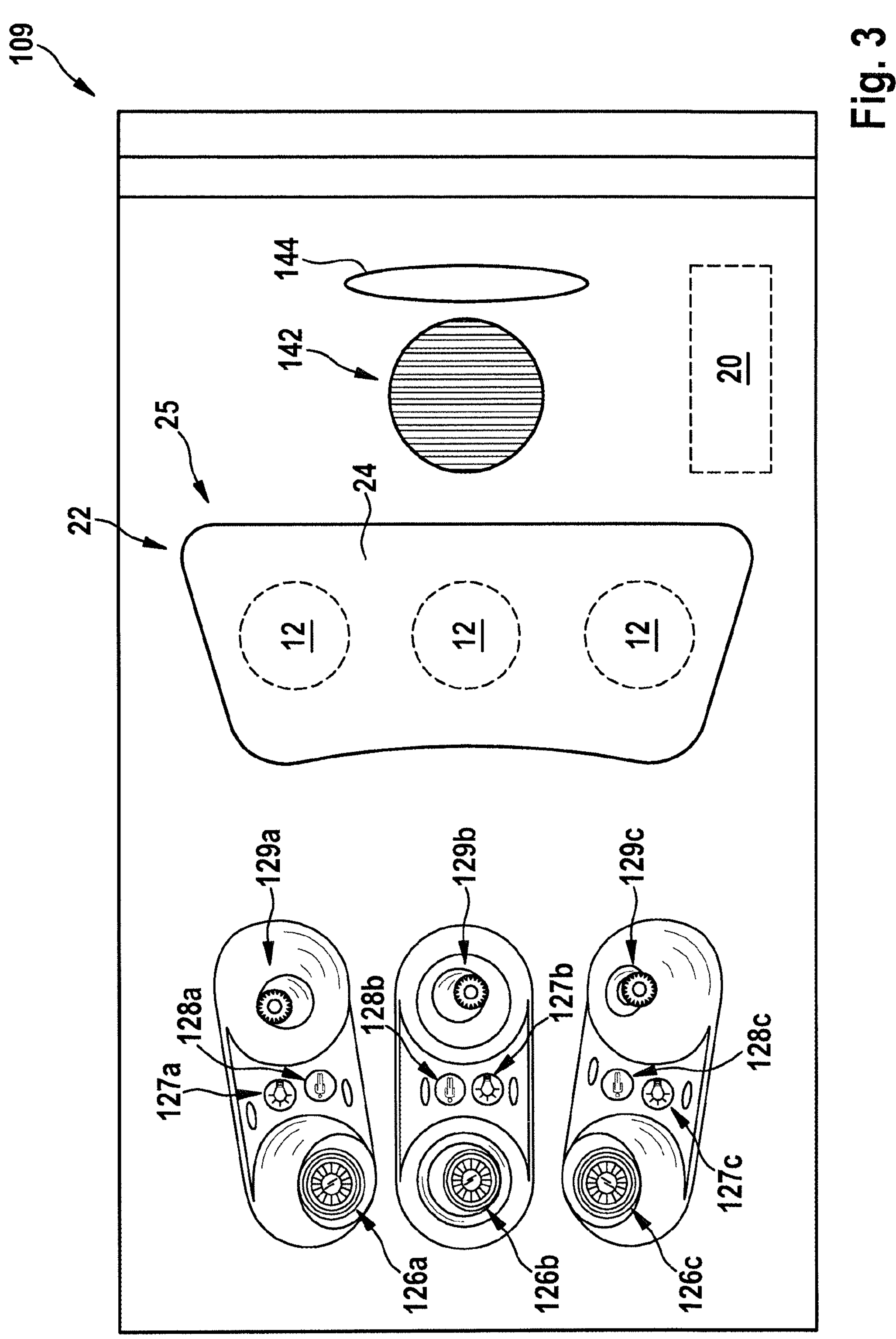
FIG. 3 depicts a schematic plan view of an aircraft overhead passenger service unit according to a comparative example.

FIG. 3 depicts a schematic plan view of an aircraft overhead passenger service unit 109 according to a comparative example, as it is seen from the position of a passenger sitting on a passenger seat 81 below the aircraft overhead passenger service unit 109.

On the side, which is shown to the left in FIG. 3, the aircraft overhead passenger service unit 109 comprises a row of three adjustable reading lights 126_a_-126_c_, which are arranged next to each other.

Six electrical switches 127_a_-127_c_, 128_a_-128_c_ are provided to the right of the read-ing lights 126_a_-126_c_, a respective pair of two switches 127_a_-127_c_, 128_a_-128_c_ next to each of the reading lights 126_a_-126_c_. A first one of the switches 127_a_-127_c_ of each pair is configured for switching the adjacent reading light 126_a_-126_c_, and the second switch 128_a_-128_c_ of each pair is configured for triggering a signal for calling cabin service personnel.

A row of three adjacent gaspers 129_a_-129_c_ is provided next to the switches 127_a_-127_c_, 128_a_-128_c_.

Adjacent to the gaspers 129_a_-129_c_, there is an oxygen mask storage portion 25 comprising a movable door 24, which covers an oxygen mask storage compartment 22. The oxygen mask storage compartment 22 houses at least three oxygen masks 12, which are coupled to an oxygen supply 20, for example to an oxygen source 20 such as a pressurized oxygen container or a chemical oxygen generator.

In an emergency situation, which results in a loss of pressure within the passenger cabin 104, the movable door 24 will open and allow the oxygen masks 12 to drop out of the oxygen mask storage compartment 22. Each of the passengers sitting below the aircraft overhead passenger service unit 109 may grasp one of the oxy-gen masks 12. After being activated, the oxygen supply 20 may supply an oxygen rich gas to the oxygen masks 12, in order to allow the passengers to breathe almost normally, even in case of a pressure loss within the passenger cabin 104.

The oxygen supply 20 may be activated in response to an emergency signal provided by a controller in response to a pressure loss within the passenger cabin. Alternatively, the oxygen supply 20 may be activated in response to a first breath taken by a passenger through the oxygen mask 12.

Towards the right from the oxygen mask storage portion 25 in the viewing direction of FIG. 3, a grid 142 is formed within the aircraft overhead passenger service unit 109. A loudspeaker (not shown), which may be used for delivering acoustic announcements to the passengers, may be arranged behind said grid 142.

Next to the grid 142, there is a display panel 144, which may be configured for selectively showing a plurality of visual messages (not shown), such as "non smoking" or "fasten your seat belt". The display panel 144 may be illuminated from behind, in order to deliver visual information to the passengers sitting below the aircraft over-head passenger service unit 109.

In order to provide the desired functionalities, an aircraft overhead passenger ser-vice unit 109, as is shown in FIG. 3, is positioned in a predefined position above the associated passenger seats 81, resulting in a predefined relative position be-tween the aircraft overhead passenger service unit 109 and the associated passenger seat 81. In consequence, the correct positions of the aircraft overhead passenger service units 109 within the passenger cabin 104 depend on the positions of the associated passenger seats 81, in particular on the positions of the associated passenger seats 81 along the longitudinal direction L of the passenger cabin 104 (cf. FIG. 2).

Figure 4:
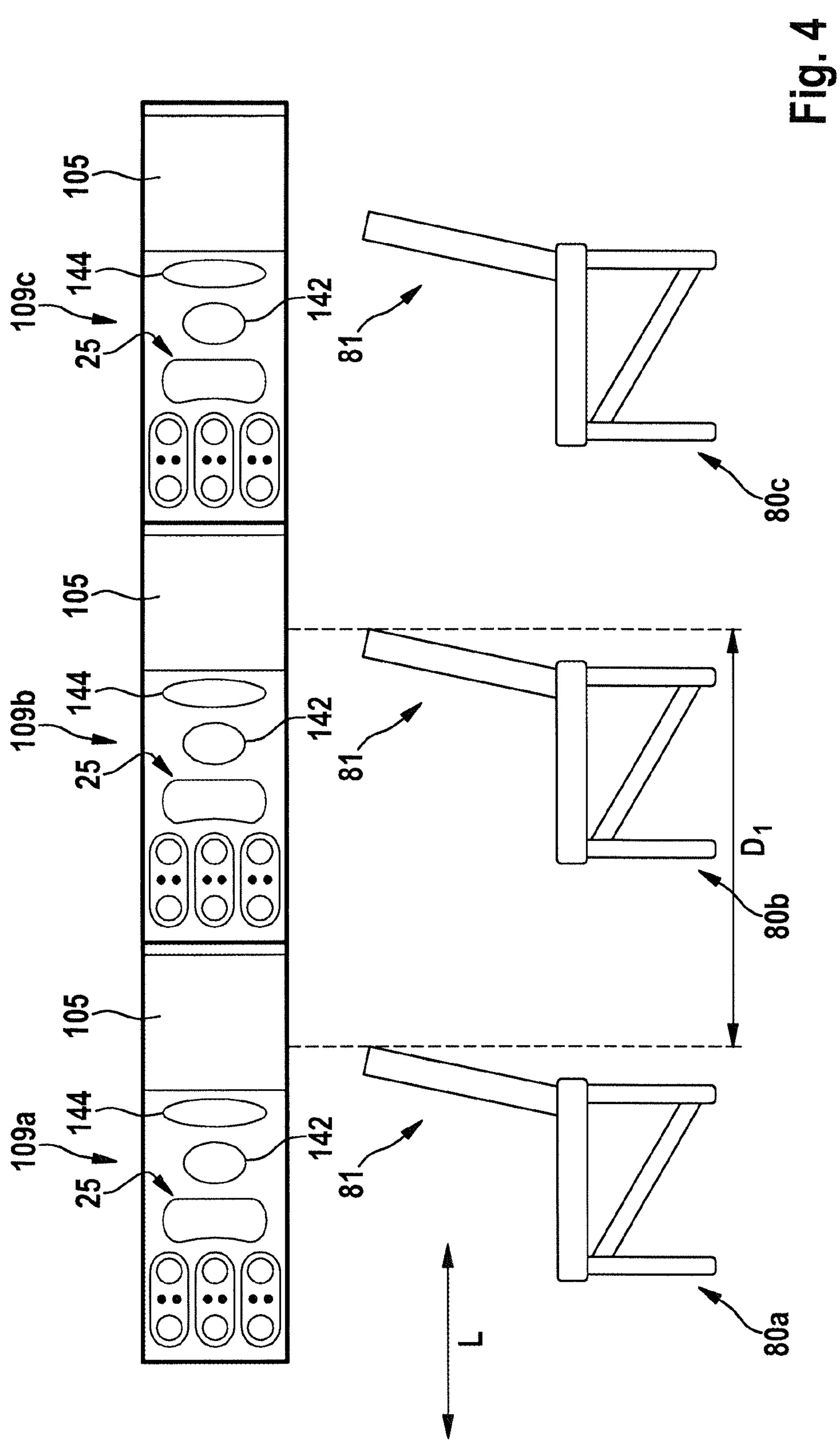
FIG. 4 shows a schematic longitudinal cross-sectional view of a section of a passenger cabin with a first passenger seat configuration.
Figure 5:
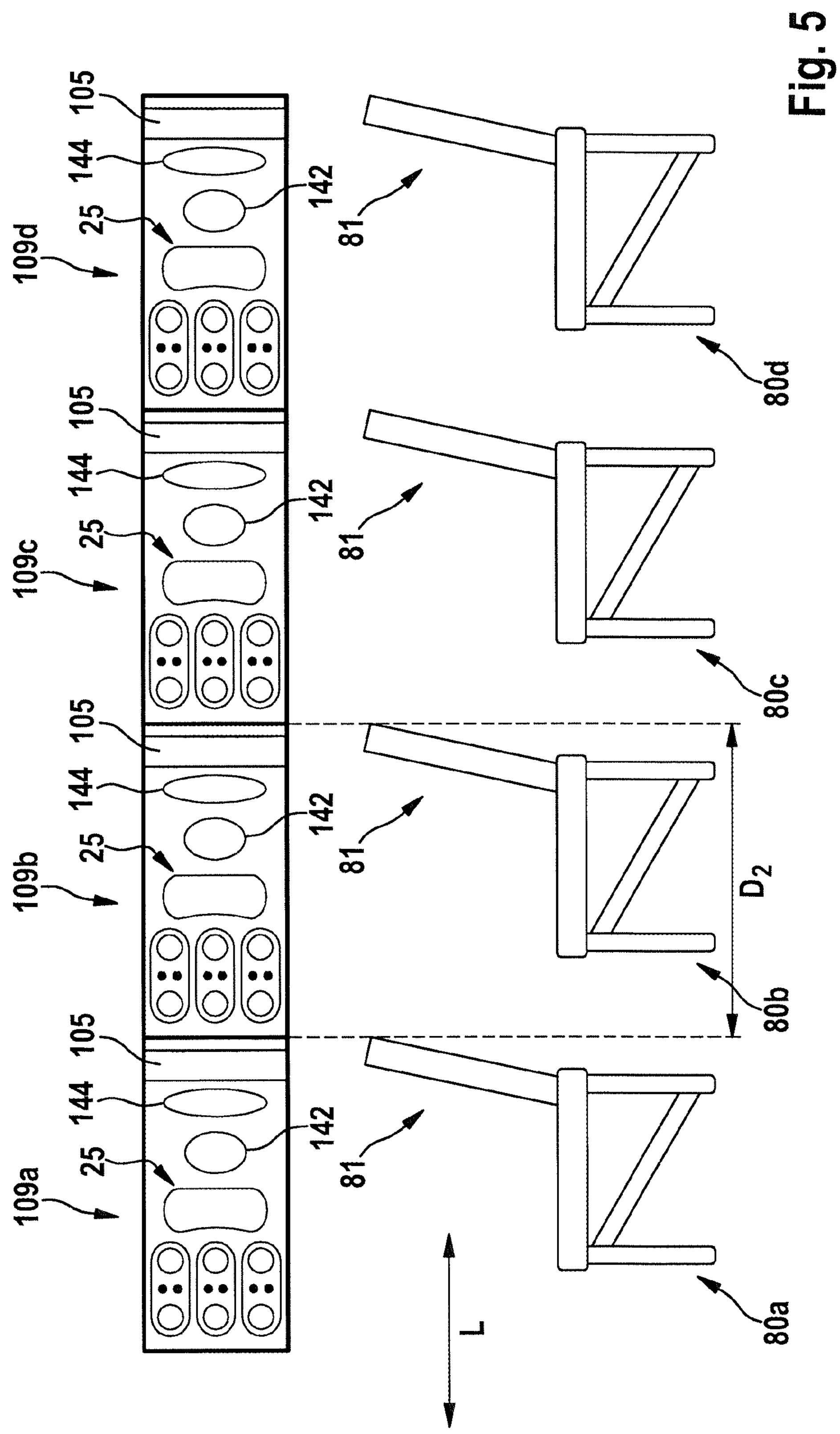
FIG. 5 shows a schematic longitudinal cross-sectional view of a section of a passenger cabin with a second passenger seat configuration.

Two different passenger seat configurations are schematically depicted in FIGS. 4 and 5.

In the first seat configuration, which is depicted in FIG. 4, the distance D1 between adjacent seat rows 80_a_-80_c_ of passenger seats 81 along the longitudinal di-rection L may be, for example, 889 mm or 35 inches.

A section comprising three rows 80_a_-80_c_ of passenger seats 81 is depicted in FIG. 4. An aircraft overhead passenger service unit 109_a_-109_c_ is arranged above each of the three seat rows 80_a_-80_c_, respectively.

Filler elements 105 are arranged between adjacent aircraft overhead passenger service units 109, in order to fill the gaps between adjacent aircraft overhead passenger service units 109.

In the second configuration, which is depicted in FIG. 5, the distance D2 between adjacent seat rows 80_a_-80_c_ of the passenger seats 81 along the longitudinal direction L is shorter than in the first configuration depicted in FIG. 4. The distance D2 between adjacent rows 80_a_-80_c_ of the passenger seats 81 along the longitudinal direction L may, for example, be 660 mm or 26 inches.

In order to ensure that the aircraft overhead passenger service units 109_a_-109_d_ are arranged above the respectively associated passenger seats 81, the distances be-tween the aircraft overhead passenger service units 109 are reduced in accordance with the new distance D2 between the rows 80_a_-80_c_ of passenger seats 81. The lengths of the filler elements 105, which are arranged between adjacent aircraft overhead passenger service units 109, are reduced accordingly.

In other words, if the seat configuration within the passenger cabin 104 is changed, e.g. from the first seat configuration depicted in FIG. 4 to the second seat configuration depicted in FIG. 5, or vice versa, in particular if the distance D1, D2 be-tween the rows 80_a_-80_c_ of passengers seats 81 along the longitudinal direction L is changed, the positions of the aircraft overhead passenger service units 109 need to be adjusted, and the filler elements 105 need to be replaced with different filler elements 105 having another length.

Changing the positions of the passenger service units 109 and replacing the filler elements 15 is cumbersome and time consuming.

It would therefore be beneficial to provide improved aircraft overhead passenger service units which may be adjusted to different seat configurations within the air-craft passenger cabin 104 more easily.

Figure 6A:
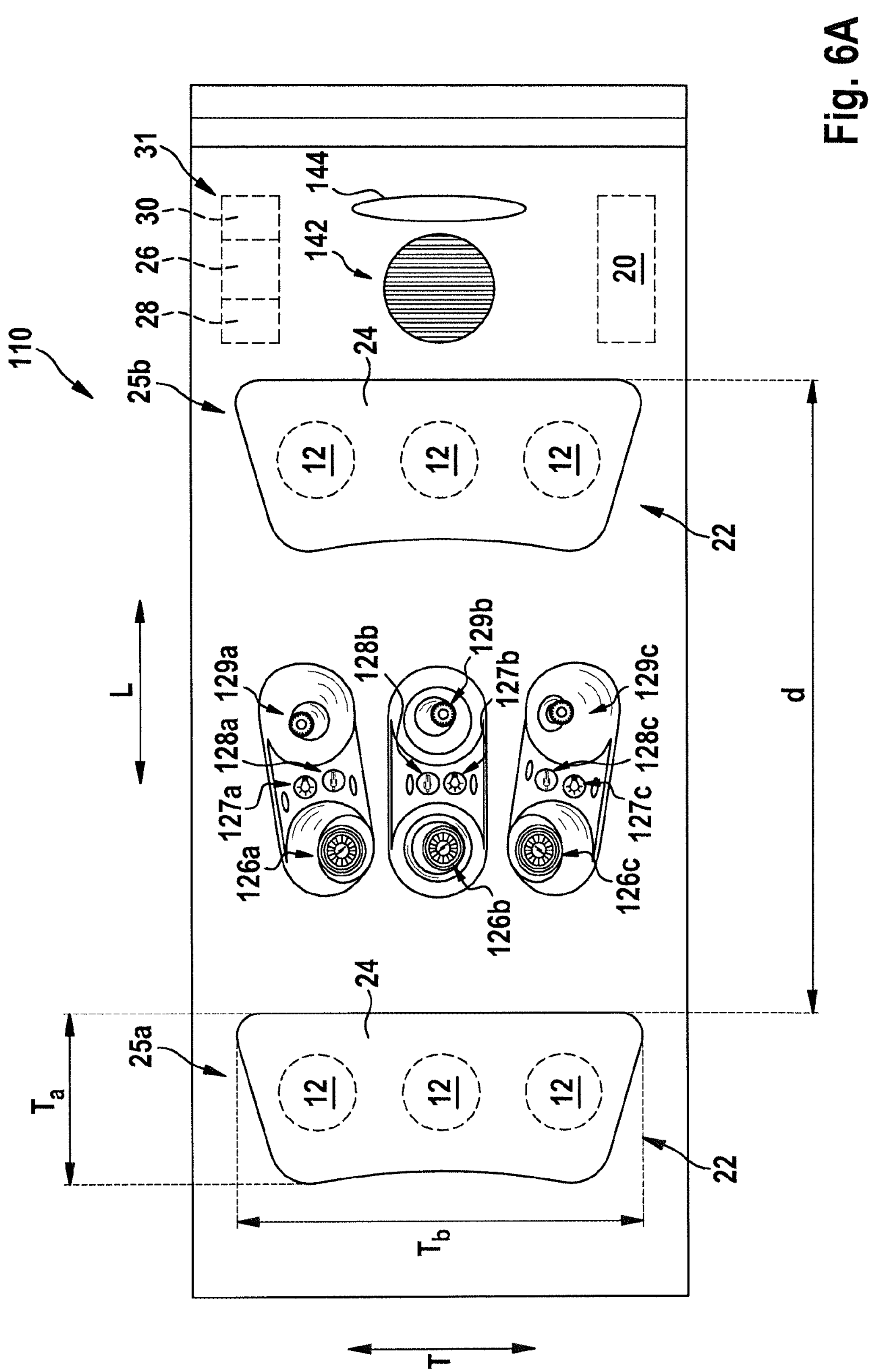
FIG. 6A depicts a schematic plan view of an aircraft overhead passenger service unit in accordance with an exemplary embodiment of the invention.

FIG. 6A depicts a schematic plan view of an aircraft overhead passenger service unit 110 in accordance with an exemplary embodiment of the invention, as it is seen from the position of a passenger sitting on a passenger seat 81 below the air-craft overhead passenger service unit 110.

Those components of the aircraft overhead passenger service unit 110 depicted in FIG. 6A that are analogous to the elements of the aircraft overhead passenger service unit 109 depicted in FIG. 3 are denoted with the same reference numerals and will not be discussed in detail again. Reference is made to their description above.

The aircraft overhead passenger service unit 110 according to an exemplary embodiment of the invention, as it is depicted in FIG. 6A, differs from the aircraft overhead passenger service unit 109, as it is depicted in FIG. 3, inter alia in that it comprises two oxygen mask storage portions 25*a*, 25*b*, which are spaced from each other along the longitudinal direction L.

At least one oxygen mask 12 is stored in each oxygen mask storage portion 25*a*, 25*b*. In other words, the oxygen masks 12, which are provided within the aircraft overhead passenger service unit 110, are distributed among the two oxygen mask storage portions 25*a*, 25*b*. In particular, the oxygen masks 12 may be distributed such that a first group of oxygen masks 12 is stored in the first oxygen mask storage portion 25*a* and second group of oxygen masks 12 is stored in the second oxygen mask storage portion 25*b*.

One, two, three, four or five oxygen masks 12 may be stored in each of the at least two oxygen mask storage portions 25*a*, 25*b*, respectively. The number of oxygen masks 12, which are stored in each oxygen mask storage portion 25*a*, 25*b*, may in particular depend on the number of passenger seats 81 in each seat row 80 associated with the respective aircraft overhead passenger service unit 110. At least one oxygen mask 12 for each associated passenger seat 18 may be stored in the two oxygen mask storage portions 25*a*, 25*b*.

For example, one oxygen mask 12 for each passenger seat 81, associated with the respective aircraft overhead passenger service unit 110, and at least one additional oxygen mask 12, providing a spare oxygen mask 12, may be stored in each of the at least two oxygen mask storage portions 25*a*, 25*b*, respectively.

In the exemplary embodiment depicted in FIG. 6A, three oxygen masks 12 are stored in each oxygen mask storage portion 25*a*, 25*b*, respectively.

In each of the at least two oxygen mask storage portions 25*a*, 25*b*, the oxygen masks 12 may be stored as an array of oxygen masks 12. In such an array of oxy-gen masks 12, the oxygen masks 12 may be arranged next to each other along a transverse direction T, which is oriented perpendicularly to the longitudinal direction L.

Each of the at least two oxygen mask storage portions 25*a*, 26*b* may have a maximum extension Ta of 203 mm (8 inches), in particular a maximum extension Ta of 152 mm (6 inches) in the longitudinal direction L, and a maximum extension Tb of 610 mm (24 inches), in particular a maximum extension Tb of 305 mm (12 inches) in the transverse direction.

The distance d between the first and second oxygen mask storage portions 25*a*, 25*b* along the longitudinal direction L may be between 254 mm (10 inches) and 457 mm (18 inches), the distance d may in particular be between 330 mm (13 inches) and 381 mm (15 inches).

The aircraft overhead passenger service unit 110 may comprise a joint oxygen supply 20, for example a joint oxygen source such as a joint pressurized oxygen container or a joint chemical oxygen generator, which is configured for supplying oxygen to all oxygen masks 12, stored in the two oxygen mask storage portions 25*a*, 25*b*.

In an alternative configuration, which is not explicitly shown in the figures, the oxygen masks 12 may be supplied with oxygen from a centralized oxygen supply 20, which is configured for supplying oxygen to the oxygen masks 12 of a plurality of aircraft overhead passenger service units 110.

The aircraft overhead passenger service unit 110 further comprises an oxygen mask controller 26, which is switchable between at least two different oxygen mask supply configurations. Each of the at least two different oxygen mask storage portions 25*a*, 25*b* is associated with a particular one of the at least two different oxygen mask supply configurations. In the event of a pressure loss within the passenger cabin 104, each of the at least two different oxygen mask supply configurations effects the release and potential activation of only those oxygen masks 12, which are associated with the associated oxygen mask storage portion 25*a*, 25*b*. Each of the at least two different oxygen mask supply configurations of the oxygen mask controller 26 may correspond to a particular seat configuration within the passenger cabin 104. As a result, only those oxygen masks 12, which are stored in positions above the passenger seats 81 in a suitable manner for the respective seat configuration, will be released and potentially activated in an emergency situation.

The oxygen mask controller 26 may further include an oxygen mask supply configuration, in which none of the oxygen masks 12 of the respective aircraft over-head passenger service unit 110 is released and activated, even in an emergency situation. Such a zero configuration may be used in case no passenger seats 81 are associated with the aircraft overhead passenger service unit 110 in a particular seat configuration.

The aircraft overhead passenger service unit 110 may further comprise a reading light controller 28, which is switchable between at least two different reading light configurations, so that a different reading light output is emitted by the reading lights 126*a*-126*c* in each of the at least two reading light configurations. The reading light controller 28 may be coupled to or formed integrally with the oxygen mask controller 26 for switching the reading light controller 28 together with the oxygen mask controller 26 between the at least two different configurations.

Providing a reading light controller 28 may allow for automatically adjusting the reading light output, which is provided by the reading lights 126*a*-126*c*, to the respective seat configuration. Alternatively or additionally, the reading light output, provided by the reading lights 126*a*-126*c*, may be manually adjustable for manually adapting the reading light output, which is provided by the reading lights 126*a*-126*c*, to the respective seat configuration.

The aircraft overhead passenger service unit 110 may comprise a single group of reading lights 126*a*-126*c*, as it is depicted in FIG. 6A, wherein each of the reading lights 126*a*-126*c* is switchable between at least two reading light configurations, respectively.

In an alternative embodiment, which is not explicitly shown in the figures, the aircraft overhead passenger service unit 110 may comprise a plurality of groups of reading lights, wherein each group of reading lights is associated with one of the different reading light configurations, so that the reading lights of one of the plurality of groups of reading lights are activated depending on the selected reading light configuration.

The aircraft overhead passenger service unit 110 may also comprise a gasper controller 30, which is switchable between at least two different gasper configurations, so that a different output of air is provided by the gaspers 129*a*-129*c* in each of the at least two gasper configurations. Alternatively or additionally, the output of air, provided by the gaspers 129*a*-129*c*, may be manually adjustable for manually adapting the output of air, provided by the gaspers 129*a*-129*c*, to the respective seat configuration.

The gasper controller 30 may be coupled to or formed integrally with the oxygen mask controller 26 for switching the gasper controller 30 together with the oxygen mask controller 26 between the at least two different configurations.

In an embodiment, in which the aircraft overhead passenger service unit 110 comprises a reading light controller 28 and a gasper controller 30, both the reading light controller 28 and the gasper controller 30 may be coupled to or formed integrally with the oxygen mask controller 26, forming a single controller 31 of the aircraft overhead passenger service unit 110.

Such an arrangement may allow for jointly switching the controllers 26, 28, 30 between the at least two oxygen mask supply configurations, the at least two reading configurations and the at least two gasper configurations, respectively.

The aircraft overhead passenger service unit 110 may comprise a single group of gaspers 129*a*-129*c*, as it is depicted in FIG. 6A, wherein each of the gaspers 129*a*-129*c* is switchable between at least two gasper configurations, respectively.

In an exemplary embodiment, which is not explicitly shown in the figures, the aircraft overhead passenger service unit 110 may comprise a plurality of groups of gaspers, wherein each group of gaspers is associated with one of the different gasper configurations, so that the gaspers of one of the plurality of groups of gaspers are activated depending on the selected gasper configuration.

Figure 6B:
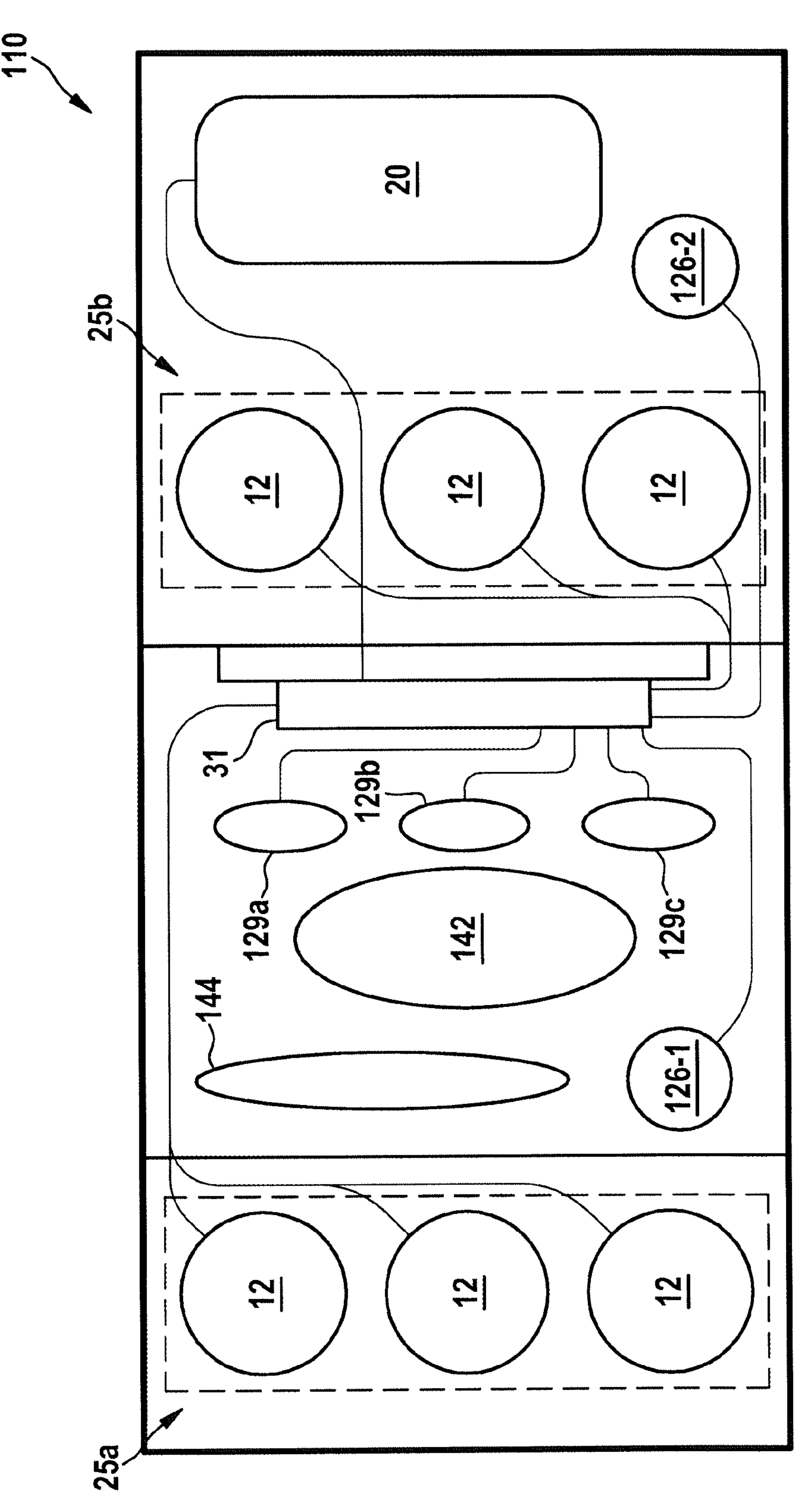
FIG. 6B depicts a schematic plan view of an aircraft overhead passenger service unit in accordance with another exemplary embodiment of the invention.

FIG. 6B depicts a schematic plan view of an aircraft overhead passenger service unit 110 in accordance with another exemplary embodiment of the invention, as it is seen from the position of a passenger sitting on a passenger seat 81 below the air-craft overhead passenger service unit 110.

Those components of the aircraft overhead passenger service unit 110 depicted in FIG. 6B that are analogous to the elements of the aircraft overhead passenger service unit 109 depicted in FIG. 6A are denoted with the same reference numerals and will not be discussed in detail again. Reference is made to their description above.

The embodiment of the aircraft overhead passenger service unit 110 depicted in FIG. 6B differs from the embodiment depicted in FIG. 6A in the spatial arrangement of its functional components.

In particular, in the embodiment depicted in FIG. 6B, the loudspeaker 142, the visual sign 144 and the controller 31 are arranged between the first and second oxygen mask storage portions 25*a*, 25*b*. Similar to the embodiment depicted in FIG. 6A, the controller 31, which is depicted as a single controller 31 in FIG. 6B, may provide the functionalities of an oxygen mask controller 26, a reading light controller 28 and a gasper controller 30. Alternatively, the oxygen mask controller 26, the reading light controller 28 and the gasper controller 30 may be provided separately.

For clarity of illustration, switches 127*a*-127*c*, 128*a*-128*c* are not depicted in FIG. 6B.

Contrary to the embodiment depicted in FIG. 6A, the embodiment, which is shown in FIG. 6B, does not comprise three reading lights 126*a*-126*c*, which are individually assigned to the passenger seats 81, respectively. Instead, the aircraft overhead passenger service unit 110, which is depicted in FIG. 6B, comprises a first multiple seat reading light 126-1 and a second multiple seat reading light 126-2. The first multiple seat reading light 126-1 is arranged between the first and second oxygen mask storage portions 25*a*, 25*b*. The second multiple seat reading light 126-2 is arranged on the right side of the second oxygen mask storage portion 25*b*, i.e. on the side of the second oxygen mask storage portion 25*b*, which is opposite to the first oxygen mask storage portion 25*a*.

Each multiple seat reading light 126-1, 126-2 is capable of emitting at least three individually switchable reading light outputs. Each reading light output is assigned to one of the passenger seats 81 located below the aircraft overhead passenger ser-vice unit 110, respectively. In other words, each reading light output is configured for providing illumination to one of said passenger seats 81.

Similar to the two oxygen mask storage portions 25*a*, 25*b*, the two multiple seat reading lights 126-1, 126-2 will be activated in correspondence with two different seat configurations within the passenger cabin 104. Depending on the respective seat configuration within the passenger cabin 104, one of the two multiple seat reading light 126-1, 126-2 will be activated for providing illumination to the passenger seats 81, which are arranged below the aircraft overhead passenger service unit 110, whereas the other of the two multiple seat reading light 126-1, 126-2 will be deactivated.

Figure 7:
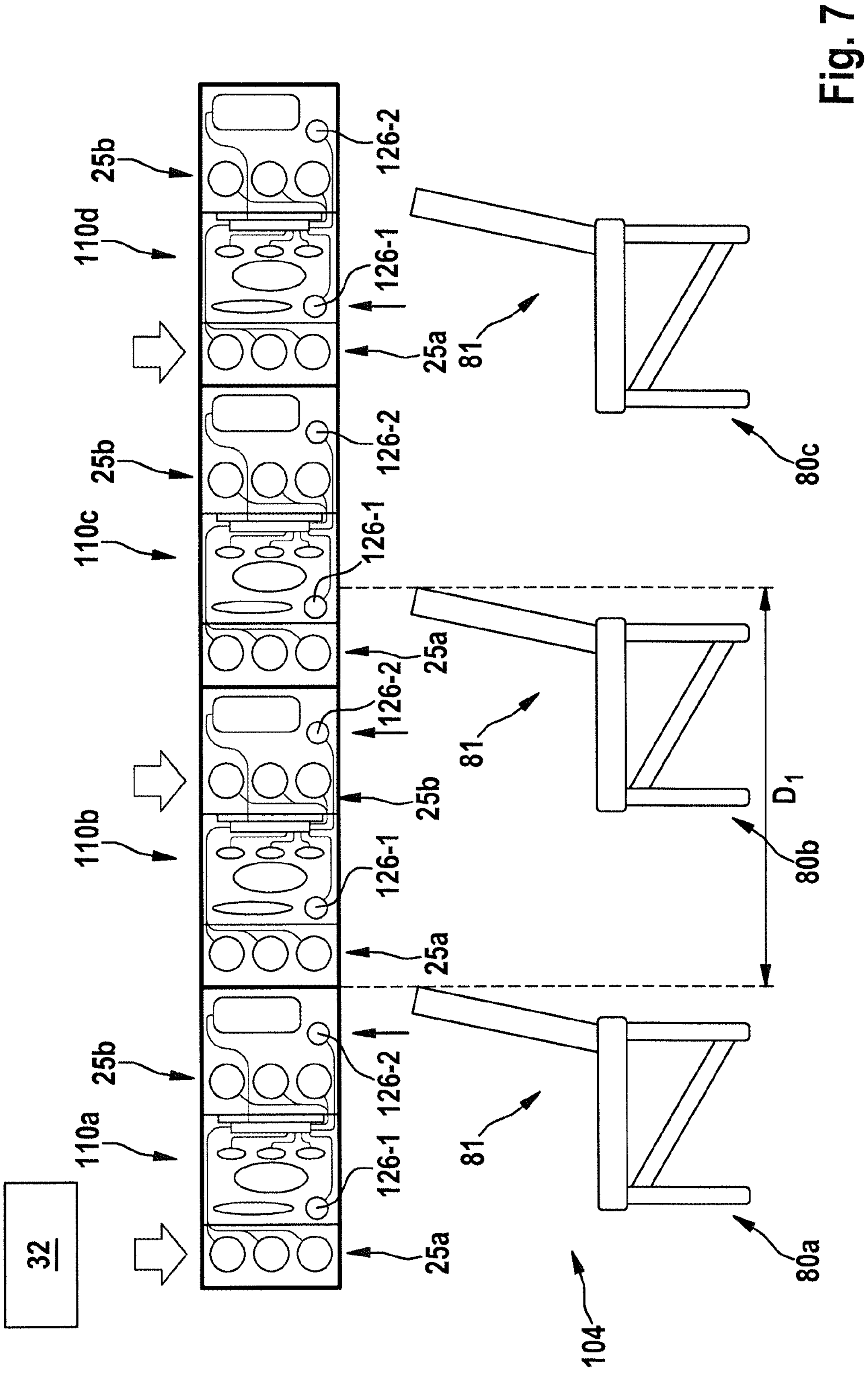
FIG. 7 shows a schematic longitudinal cross-sectional view of a section of a passenger cabin with the first passenger seat configuration, in which aircraft overhead passenger service units in accordance with an exemplary embodiment of the invention are employed.
Figure 8:
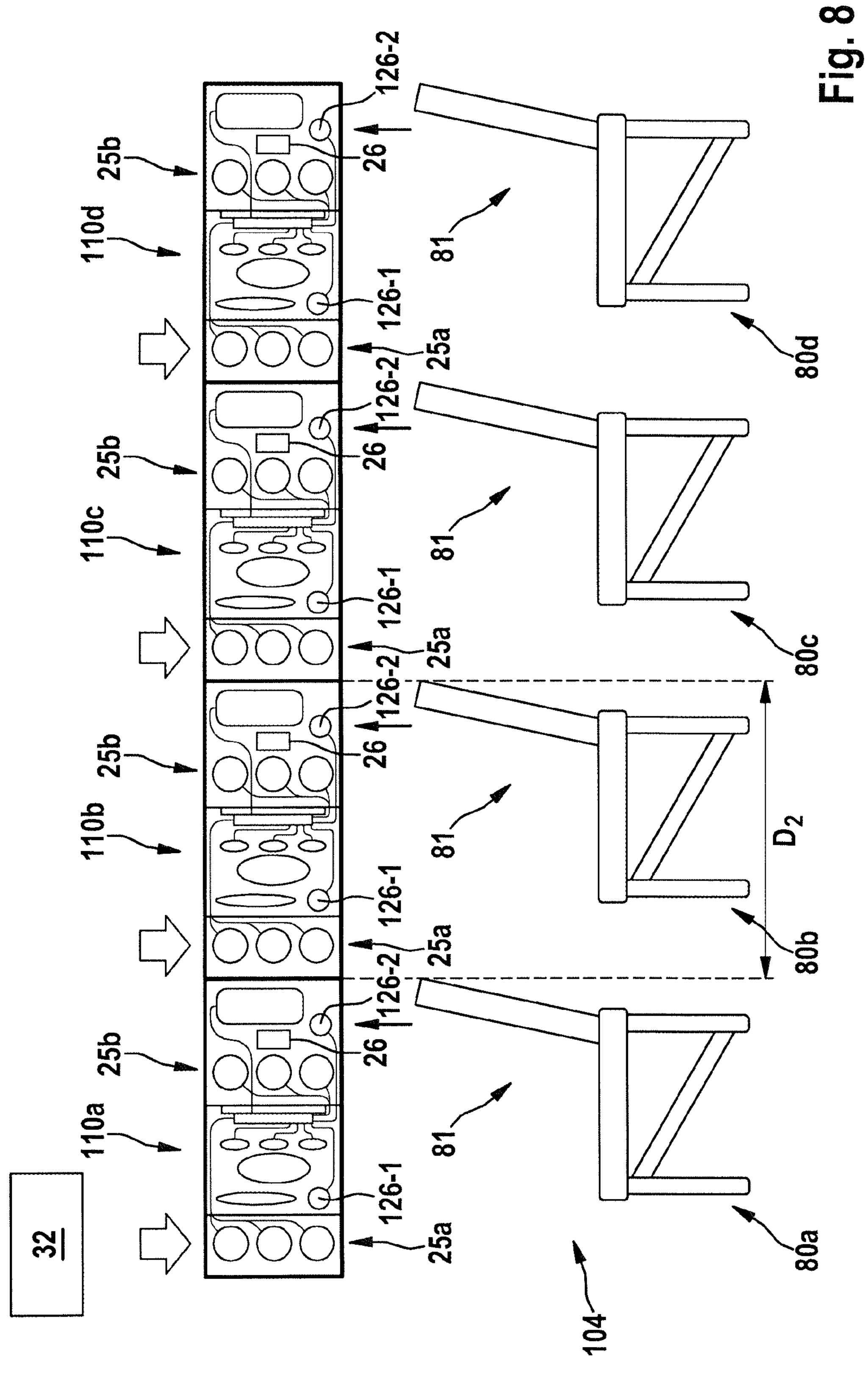
FIG. 8 shows a schematic longitudinal cross-sectional view of a section of a passenger cabin with a second passenger seat configuration, in which aircraft overhead passenger service units in accordance with an exemplary embodiment of the invention are employed.

FIGS. 7 and 8 illustrate two different seat configurations in a passenger cabin 104, which correspond to the two seat configurations depicted in FIGS. 4 and 5. The distances D1, D2 between adjacent rows 80 of passenger seats 81 along the longitudinal direction are different in the two seat configurations.

In the first seat configuration, which is depicted in FIG. 7, the distance D1 between adjacent seat rows 80*a*-80*c* of passenger seats 81 along the longitudinal di-rection L may be, for example, 889 mm or 35 inches.

In the second seat configuration, which is depicted in FIG. 8, the distance D2 between adjacent seat rows 80*a*-80*c* of the passenger seats 81 along the longitudinal direction L is shorter. In particular, the distance D2 between adjacent seat rows 80*a*-80*c* of the passenger seats 81 along the longitudinal direction L may, for example, be 660 mm or 26 inches.

In the embodiments depicted in FIGS. 7 and 8, aircraft overhead passenger ser-vice units 110*a*-110*d* according to the exemplary embodiment of the invention, which is depicted in FIG. 6B, are provided above the passenger seats 81.

In the two seat configurations depicted in FIGS. 7 and 8, the aircraft overhead passenger service units 110*a*-110*d* are located at the same positions along the longitudinal direction L. In other words, the positions of the aircraft overhead passenger service units 110*a*-110*d* are not changed between the two configurations.

In the embodiments depicted in FIGS. 7 and 8, there is further provided a central controller 32, which is coupled to the oxygen mask controllers 26 of the aircraft overhead passenger service units 110*a*-110*d* for communicating with said oxygen mask controllers 26.

The central controller 32 may be configured for communicating with the oxygen mask controllers 26 via wireless or wired connections, which are not shown in FIGS. 7 and 8. Wireless connections between the central controller 32 and the oxy-gen mask controllers 26 may be implemented using WLAN, Bluetooth®, or other suitable wireless technology.

The central controller 32 may have a memory where the locations of the plurality of aircraft overhead passenger service units and the locations of the passenger seats within the aircraft cabin, jointly referred to as the seat configuration or the seat map, are stored. For a given seat configuration/seat map and a given arrangement of aircraft overhead passenger service units, the central controller 32 may determine suitable associations between aircraft overhead passenger service units and passenger seats. Further, for each of the associations of aircraft passenger service units and passenger seats, the central controller 32 may determine the relative position between the aircraft overhead passenger service unit and the associated passenger seat/row of passenger seats. On the basis of said relative position, the central controller 32 may control the oxygen mask controller of the aircraft overhead passenger service unit in question to assume a particular one of the at least two oxygen mask supply configurations. For example, for each of the passenger seats/passenger seat rows, the oxygen mask controller of the associated aircraft over-head passenger service units may be set such that the oxygen masks of the oxy-gen mask storage portion closest to the front end of the passenger seat(s) in question are released in an emergency situation. Other rules for selecting the particular one of the at least two oxygen mask supply configurations may also be employed.

As indicated above, the central controller 32 is configured for switching the controllers 26, 31, in particular the oxygen mask controllers 26, of the aircraft overhead passenger service units 110*a*-110*d* into one of their respective oxygen mask supply configurations. The oxygen mask supply configuration, into which the respective oxygen mask controller 26 is switched, may depend on the information available at the central controller 32. As explained above, the central controller 32 may have a database of the positions of the passenger seats and the aircraft overhead passenger service units within the aircraft cabin and may calculate the oxygen mask sup-ply configurations therefrom. It is also possible that the central controller 32 has a list of different seat maps, of different potential arrangements of aircraft overhead passenger service units, and of pre-calculated associations of passenger seats, air-craft overhead passenger service units and individual oxygen mask supply configurations for selected combinations or all combinations of seat maps and aircraft overhead passenger service unit arrangements.

Such approaches may allow for adjusting the configurations of the respective controllers 26, 31 of all aircraft overhead passenger service units 110*a*-100*d* within the passenger cabin 104 in a convenient manner via the central controller 32.

Similarly, the central controller 32 may be configured for switching the controllers 28, 31, in particular the reading light controllers 28, of the aircraft overhead passenger service units 110*a*-110*d* into one of their respective reading light configurations. The reading light configuration, into which the respective controller 28, 31 is switched, may depend on the information available at the central controller 32. As explained above, the central controller 32 may have a database of the positions of the passenger seats 81 and the aircraft overhead passenger service units 110*a*-110*d* within the aircraft cabin and may calculate the reading configurations there-from. It is also possible that the central controller 32 has a list of different seat maps, of different potential arrangements of aircraft overhead passenger service units 110*a*-110*d*, and of pre-calculated associations of passenger seats 81, aircraft overhead passenger service units 110*a*-110*d* and individual reading light configurations for selected combinations or all combinations of seat maps and aircraft over-head passenger service unit arrangements.

In the first configuration, which is depicted in FIG. 7, the oxygen masks 12, which are stored in the first oxygen mask storage portions 25*a* of the first and fourth air-craft overhead passenger service units 110*a*, 110*d*, and the oxygen masks 12, which are stored in the second oxygen mask storage portion 25*b* of the second air-craft overhead passenger service unit 110*b*, will be released in an emergency situation. This is indicated by the arrows, which as depicted next to the aircraft overhead passenger service units 110*a*-110*d* in FIG. 7.

In said first configuration, none of the oxygen masks 12 of the third aircraft overhead passenger service unit 110*c* will be released in an emergency situation, as, in said first configuration, none of the oxygen masks 12 of the third aircraft overhead passenger service unit 110*c* is associated with one of the passenger seats 81.

In the first configuration, the second multiple seat reading lights 126-2 of the first and second aircraft overhead passenger service units 110*a*, 110*b*, and the first multiple seat reading light 126-1 of the fourth aircraft overhead passenger service unit 110*d* are activated, as indicated by the arrows. In the first configuration, none of the multiple seat reading lights 126-1, 126-2 of the third aircraft overhead passenger service unit 110*c* is activated.

In the second configuration, which is depicted in FIG. 8, the oxygen masks 12, which are stored in the first oxygen mask storage portions 25*a* of the first, second, third and fourth aircraft overhead passenger service units 110*a*-110*d*, will be re-leased in an emergency situation, as it is indicated by the arrows, which are shown in FIG. 8.

In said second configuration, none of the oxygen masks 12, which are stored in the second oxygen mask storage portions 25*b* of the first to fourth aircraft overhead passenger service units 110*a*-110*d*, will be released in an emergency situation, as, in said second seat configuration, none of the oxygen masks 12 stored in the second oxygen mask storage portions 25*b* is associated with one of the passenger seats 81.

In the second configuration, the first multiple seat reading lights 126-1 of all aircraft overhead passenger service units 110*a*-110*d* are deactivated, and the second multiple seat reading lights 126-2 of all aircraft overhead passenger service units 110*a*-110*d* are activated, as indicated by the arrows, which are shown in FIG. 8.

FIGS. 7 and 8 illustrate that the aircraft overhead passenger service units 110 according to exemplary embodiments of the invention may be adapted conveniently and easily to different seat configurations within the passenger cabin 104 of an air-craft 100. This adaptation may be done via the central controller 32, which switches the oxygen mask controllers 26 of the aircraft overhead passenger service units 110 into the configurations, which are suitable for the respective seat configuration.

In an aircraft 100, which is equipped with aircraft overhead passenger service units 110 according to exemplary embodiments of the invention, the aircraft overhead passenger service units 110 may in particular be adapted to different seat configurations within the passenger cabin 104, without changing the position of the aircraft overhead passenger service units 110 within the passenger cabin 104 and without adding and/or removing filler elements 105 between the aircraft overhead passenger service units 110. In consequence, the seat configuration in the passenger cab-in 104 may be changed more quickly and more conveniently than in an embodiment in which aircraft overhead passenger service units, which comprise only a single oxygen mask storage portion 25, are used.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. An aircraft overhead passenger service unit, comprising:

a plurality of oxygen masks for supplying oxygen to aircraft passengers in an emergency situation; and at least two different oxygen mask storage portions, which are spaced apart from each other in a longitudinal direction (L);

wherein the plurality of oxygen masks are stored in the at least two different oxygen mask storage portions;

wherein the aircraft overhead passenger service unit further comprises an oxygen mask controller, which is switchable between at least two different configurations, wherein the at least two different oxygen mask storage portions are individually associated with the at least two different configurations, with each of the at least two different configurations effecting a release of only the oxygen masks of the associated oxygen mask storage portion in the emergency situation;

wherein a first configuration of the at least two different configurations is for a subset of the plurality of oxygen masks stored in a first oxygen mask storage portion of the at least two different oxygen mask storage portions positioned above a first set of passenger seats and wherein in the emergency situation the subset of the plurality of oxygen masks are released from the first oxygen mask storage portion, and wherein a second configuration of the at least two different configurations is for a set of the plurality of oxygen masks stored in both the first oxygen mask storage portion and a second oxygen mask storage portion of the at least two different oxygen mask storage portions absent being positioned above any passenger seats and wherein in the emergency situation the set of the plurality of oxygen masks fail to release from the first oxygen mask storage portion and the second oxygen mask storage portion.

2. The aircraft overhead passenger service unit according to claim 1, wherein each of the at least two oxygen mask storage portions comprises an oxygen mask storage compartment with a movable door, which is configured to open for releasing the oxygen masks stored within the respective oxygen mask storage compartment.

3. The aircraft overhead passenger service unit according to claim 1, wherein one, two, three, four or five oxygen masks are stored in each of the at least two oxygen mask storage portions;

and/or wherein an equal number of oxygen masks is stored in each of the at least two oxygen mask storage portions.

4. The aircraft overhead passenger service unit according to claim 1, wherein each of the at least two oxygen mask storage portions comprises an array of oxygen masks in a transverse direction (T), and/or wherein each of the at least two oxygen mask storage portions has a maximum extension (Ta) of 203 mm, or 8 inches in the longitudinal direction (L) and a maximum extension (Tb) of 610 mm, or 24 inches in the transverse direction (T).

5. The aircraft overhead passenger service unit according to claim 1, wherein the distance (d) between the oxygen mask storage portions along the longitudinal direction (L) is between 254 mm (10 inches) and 457 mm (18 inches).

6. The aircraft overhead passenger service unit according to claim 1, further comprising an oxygen supply for supplying oxygen to the oxygen masks, wherein the aircraft overhead passenger service unit comprises a joint oxygen supply for supplying oxygen to the oxygen masks of each of the at least two different oxygen mask storage portions.

7. The aircraft overhead passenger service unit according to claim 1, further comprising at least one reading light and a reading light controller, which is switchable between at least two different reading light configurations, wherein a different reading light output is provided by the at least one reading light in each of the at least two reading light configurations.

8. The aircraft overhead passenger service unit according to claim 7, wherein the reading light controller is coupled to or formed integrally with the oxygen mask controller for switching the reading light controller between the at least two different reading light configurations together with the oxygen mask controller.

9. The aircraft overhead passenger service unit according to claim 1, further comprising at least one gasper and a gasper controller, which is switchable between at least two different gasper configurations, wherein a different output of air is provided by the at least one gasper in each of the at least two gasper configurations.

10. The aircraft overhead passenger service unit according to claim 9, wherein the gasper controller is coupled to or formed integrally with the oxygen mask controller for switching the gasper controller between the at least two different gasper configurations together with the oxygen mask controller.

11. The aircraft comprising a passenger cabin and a plurality of aircraft overhead passenger service units according to claim 1, wherein the plurality of aircraft overhead passenger service units are installed as one or more aircraft overhead passenger service unit arrays along a longitudinal direction (L) of the aircraft within the passenger cabin.

12. The aircraft according to claim 11, wherein the aircraft cabin is configured to be selectively equipped with passenger seats in accordance with a plurality of seat maps, wherein the plurality of seat maps differ, for at least a portion of the aircraft cabin, with respect to the distances between adjacent passengers seats along the longitudinal direction (L) of the aircraft, wherein, for each of the plurality of different seat maps, each passenger seat is associated with a particular one of the plurality of aircraft overhead passenger service units, and wherein, for at least a portion of the aircraft cabin, the relative positions between the plurality of aircraft overhead passenger service units and the respectively associated passenger seats differ among the plurality of seat maps.

13. The aircraft according to claim 12, further comprising a central controller, which is coupled to the oxygen mask controllers of the plurality of aircraft overhead passenger service units, wherein the central controller is configured to:

determine the relative positions between the plurality of aircraft overhead passenger service units and the respectively associated passenger seats for a current seat map of the aircraft cabin of the aircraft; and for each of the plurality of aircraft overhead passenger service units, control the oxygen mask controller of the respective aircraft overhead passenger service unit to assume a particular one of the at least two different configurations on the basis of said relative positions.

14. A method of configuring an aircraft overhead passenger service unit according to claim 1, comprising:

on the basis of a service unit position of the aircraft overhead passenger service unit within a passenger cabin of an aircraft, determining an associated passenger seat or a row of associated passenger seats within the passenger cabin; and on the basis of the service unit position of the aircraft overhead passenger service unit and a seat position of the associated passenger seat or the row of associated passenger seats, selecting a particular one of the at least two different configurations of the oxygen mask controller.

15. A method of configuring the plurality of aircraft overhead passenger service units of an aircraft according to claim 11, wherein the method includes:

relating a current seat map of the aircraft cabin of the aircraft to the positions of the plurality of aircraft overhead passenger service units within the aircraft cabin; and for each of the plurality of aircraft overhead passenger service units, controlling the oxygen mask controller of the respective aircraft overhead passenger service unit to assume a particular one of the at least two different configurations on the basis of said relating of the current seat map of the aircraft cabin of the aircraft to the positions of the plurality of aircraft overhead passenger service units within the aircraft cabin.

* * * * *